(12) United States Patent
Seki et al.

(10) Patent No.: US 8,439,638 B2
(45) Date of Patent: May 14, 2013

(54) BLADE PITCH CONTROLLER, WIND TURBINE GENERATOR, AND METHOD OF CONTROLLING BLADE PITCH

(75) Inventors: Seita Seki, Tokyo (JP); Tomohiro Numajiri, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 142 days.

(21) Appl. No.: 13/023,008

(22) Filed: Feb. 8, 2011

(65) Prior Publication Data

US 2012/0134801 A1  May 31, 2012

Related U.S. Application Data

(63) Continuation of application No. PCT/JP2010/071063, filed on Nov. 25, 2010.

(51) Int. Cl.
*F03D 7/00* (2006.01)
(52) U.S. Cl.
USPC ....... 416/1; 416/31; 416/37; 416/42; 416/156
(58) Field of Classification Search .............. 416/1, 31, 416/36, 37, 42, 44, 47–48, 147, 156–158, 416/159; 60/398, 431
See application file for complete search history.

(56) References Cited

U.S. PATENT DOCUMENTS

| 4,986,071 A * | 1/1991 | Voss et al. ............... 60/420 |
| 2006/0188371 A1 | 8/2006 | Christensen et al. |
| 2010/0104439 A1 | 4/2010 | Nomaguchi et al. |

FOREIGN PATENT DOCUMENTS

| DE | 102006012009 A1 * | 9/2007 |
| JP | H08-226373 A | 9/1996 |
| JP | 2002-303255 | 10/2002 |
| KR | 10-2010-0093545 A | 8/2010 |

OTHER PUBLICATIONS

Korean Intellectual Property Office, "Notice of Allowance for KR 10-2011-7007631", Sep. 17, 2012.

* cited by examiner

*Primary Examiner* — Edward Look
*Assistant Examiner* — Jesse Prager
(74) *Attorney, Agent, or Firm* — Manabu Kanesaka; Kenneth M. Berner; Benjamin J. Hauptman (57) ABSTRACT

A hydraulic cylinder is coupled to blades of a wind turbine generator and actuated to change a pitch angle of the blade. A variable displacement hydraulic pump supplies hydraulic oil to the hydraulic cylinder, and a discharge pressure of the pump does not follow a load pressure. When the discharge pressure of the hydraulic pump becomes a set pressure, a pressure control valve is opened to change a discharge amount of the hydraulic pump, and to make the discharge pressure of the hydraulic pump to be a pressure smaller than a cut off pressure. Further, a setting control unit sets the set pressure based on the hydraulic pressure that the hydraulic cylinder requires such that the set pressure becomes a minimum pressure required to change the pitch angle to a predetermined angle by the hydraulic cylinder.

9 Claims, 7 Drawing Sheets

BLADE PITCH CONTROLLER, WIND TURBINE GENERATOR, AND METHOD OF CONTROLLING BLADE PITCH

CROSS REFERENCE TO RELATED APPLICATIONS

This application is a continuation application of PCT/JP2010/071063 filed on Nov. 25, 2010.

BACKGROUND OF THE INVENTION

1. Field of the Invention

The present invention relates to a blade pitch controller, a wind turbine generator, and a method of controlling the blade pitch.

2. Description of Related Art

A wind turbine generator that generates power based on the rotation of a rotor to which a plurality of blades are turnably coupled is provided with, as described in JP2002-303255A, a hydraulic cylinder for driving the blades. Driving of the hydraulic cylinder allows each blade to turn with respect to the rotor, thereby changing a pitch of the blades.

Further, a variable displacement hydraulic pump (for example, an axial piston pump which is a swash plate hydraulic pump) is often used as a hydraulic pump that supplies hydraulic oil to the hydraulic cylinder. The hydraulic pump provides an advantageous effect that its discharge flow rate follows a load flow rate within a setting range of the pump.

However, while the discharge flow rate of the hydraulic pump follows the load flow rate, a discharge pressure of the hydraulic pump does not follow a load pressure. Accordingly, a differential pressure between the discharge pressure and the load pressure results in a dissipative energy, and lost mainly as a thermal energy, thereby increasing the temperature of the hydraulic oil.

Therefore, an output of an electric motor for driving the pump excessively increases by an amount of the differential pressure, and, in order to maintain the temperature of the hydraulic oil to be an adequate temperature, a cooling function such as an oil cooler is also required as the temperature increases due to the differential pressure.

BRIEF SUMMARY OF THE INVENTION

The present invention is made in view of the above circumstances, and an object of the present invention is to provide a blade pitch controller, a wind turbine generator, and a method of controlling a blade pitch, capable of reducing a differential pressure between a discharge pressure of a hydraulic pump and a load pressure even if the hydraulic pump that is a variable displacement hydraulic pump whose discharge pressure does not follow the load pressure is used for supplying a hydraulic oil to a hydraulic cylinder for changing a pitch angle of blades.

In order to solve the above problem, a blade pitch controller, a wind turbine generator, and a method of controlling a blade pitch according to the present invention employs means as described below.

Specifically, a blade pitch controller according to the present invention is a blade pitch controller for a wind turbine generator that generates power by rotation of a rotor to which a plurality of blades are turnably coupled, the blade pitch controller including: a hydraulic cylinder coupled to the blades and configured to be actuated to change a pitch angle of the blades; a variable displacement hydraulic pump configured to supply hydraulic oil to the hydraulic cylinder, a discharge pressure of the pump not following a load pressure, the hydraulic oil not being discharged at a pressure greater than a previously determined first pressure; a valve configured to be opened to change a discharge amount of the hydraulic pump and to make the discharge pressure of the hydraulic pump to be a second pressure that is smaller than the first pressure when the discharge pressure of the hydraulic pump becomes a set pressure; and discharge pressure setting means configured to set the set pressure based on the hydraulic pressure that the hydraulic cylinder requires such that the second pressure becomes a pressure at which the hydraulic cylinder changes the pitch angle to a predetermined angle.

According to the present invention, the hydraulic cylinder is coupled to the blades of the wind turbine generator and actuated to change the pitch angle of the blades, the variable displacement hydraulic pump is, for example, a swash plate hydraulic pump (axial piston pump) or a radial piston pump, and supplies the hydraulic oil to the hydraulic cylinder, the discharge pressure of the pump does not follow the load pressure, and the hydraulic oil is not discharged at a pressure greater than a previously determined first pressure.

The valve is opened when the discharge pressure of the hydraulic pump becomes the set pressure, and whereby the valve changes the discharge amount of the hydraulic pump, and makes the discharge pressure of the hydraulic pump to be the second pressure that is smaller than the first pressure.

Then, the set pressure is set by the discharge pressure setting means based on the hydraulic pressure that the hydraulic cylinder requires such that the second pressure becomes a pressure at which the pitch angle is changed to a predetermined angle by the hydraulic cylinder.

Therefore, the discharge pressure of the hydraulic pump becomes a minimum required pressure for driving the hydraulic cylinder. Accordingly, even when the variable displacement hydraulic pump is used to supply the hydraulic oil to the hydraulic cylinder for changing the pitch angle of the blade, it is possible to reduce a differential pressure between the discharge pressure of the hydraulic pump and the load pressure.

Further, the blade pitch controller according to the present invention can be such that the hydraulic cylinder is one of a plurality of hydraulic cylinders, and the discharge pressure setting means sets the set pressure based on a highest hydraulic pressure out of hydraulic pressures that the plurality of hydraulic cylinders respectively require.

According to the present invention, even if the hydraulic pressures that the hydraulic cylinders require are different from one another, the discharge pressure setting means sets the set pressure at which the valve is opened based on the highest hydraulic pressure. Therefore, even if the pitch angles of the blades of the wind turbine generator are controlled individually, it is possible to reduce the differential pressure between the discharge pressure of the hydraulic pump and the load pressure.

Moreover, the blade pitch controller according to the present invention can further include measuring means configured to measure a physical amount generated by the hydraulic cylinder, and the discharge pressure setting means derives the hydraulic pressure that the hydraulic cylinder requires using the physical amount measured by the measuring means, and sets the set pressure based on the derived hydraulic pressure.

According to the present invention, the discharge pressure setting means derives the hydraulic pressure that the hydraulic cylinder requires using the physical amount measured by the measuring means and sets the set pressure at which the valve is opened based on the derived hydraulic pressure.

Therefore, it is possible to constantly derive the hydraulic pressure that the hydraulic cylinder requires more easily.

Furthermore, the blade pitch controller according to the present invention can be such that the discharge pressure setting means derives the hydraulic pressure that the hydraulic cylinder requires using information that the wind turbine generator holds, and sets the set pressure based on the derived hydraulic pressure.

According to the present invention, the discharge pressure setting means derives the hydraulic pressure that the hydraulic cylinder requires using the information that the wind turbine generator holds and sets the set pressure at which the valve is opened based on the derived hydraulic pressure. Therefore, it is possible to constantly derive the hydraulic pressure that the hydraulic cylinder requires with a simple configuration.

Further, the blade pitch controller according to the present invention can be such that the information that the wind turbine generator holds includes at least one of an output of a power generator provided for the wind turbine generator, the pitch angle of the blades, an azimuth angle of the blades, and a rotation speed of the rotor.

According to the present invention, as the hydraulic pressure that the hydraulic cylinder requires is derived using a cylinder thrust force that is geometrically converted, it is possible to constantly derive the hydraulic pressure that the hydraulic cylinder requires more easily.

On the other hand, a wind turbine generator according to the present invention includes: a rotor provided with a plurality of blades; and a blade pitch controller, the apparatus changing a pitch angle of the plurality of blades provided for the rotor.

According to the present invention, providing the blade pitch controller as described above allows to make the discharge pressure of the hydraulic pump to be a minimum required pressure for driving the hydraulic cylinder. Therefore, it is possible to reduce the differential pressure between the discharge pressure of the hydraulic pump and the load pressure.

Further, a method of controlling a blade pitch according to the present invention is a method of controlling a blade pitch for a wind turbine generator provided with: a hydraulic cylinder coupled to blades and configured to be actuated to change a pitch angle of the blades; and a variable displacement hydraulic pump configured to supply hydraulic oil to the hydraulic cylinder, a discharge pressure of the pump not following a load pressure, the hydraulic oil not being discharged at a pressure greater than a previously determined first pressure, the method including the step of: setting a set pressure, using a valve configured to be opened to change a discharge amount of the hydraulic pump and to make the discharge pressure of the hydraulic pump to be a second pressure that is smaller than the first pressure when the discharge pressure of the hydraulic pump becomes the set pressure, based on the hydraulic pressure that the hydraulic cylinder requires, such that the second pressure becomes a pressure at which the hydraulic cylinder changes the pitch angle to a predetermined angle.

According to the present invention, the discharge pressure of the hydraulic pump becomes a minimum required pressure for driving the hydraulic cylinder. Therefore, it is possible to reduce the differential pressure between the discharge pressure of the hydraulic pump and the load pressure.

According to the present invention, there is provided an advantageous effect of reducing a differential pressure between a discharge pressure of a hydraulic pump and a load pressure even if the hydraulic pump that is a variable displacement hydraulic pump whose discharge pressure does not follow the load pressure is used for supplying a hydraulic oil to a hydraulic cylinder for changing a pitch angle of blades.

DETAILED DESCRIPTION OF THE INVENTION

The following describes embodiments of a blade pitch controller, a wind turbine generator, and a method of controlling a blade pitch according to the present invention with reference to the drawings.

First Embodiment

In the following, a first embodiment of the present invention is described.

Figure 1:
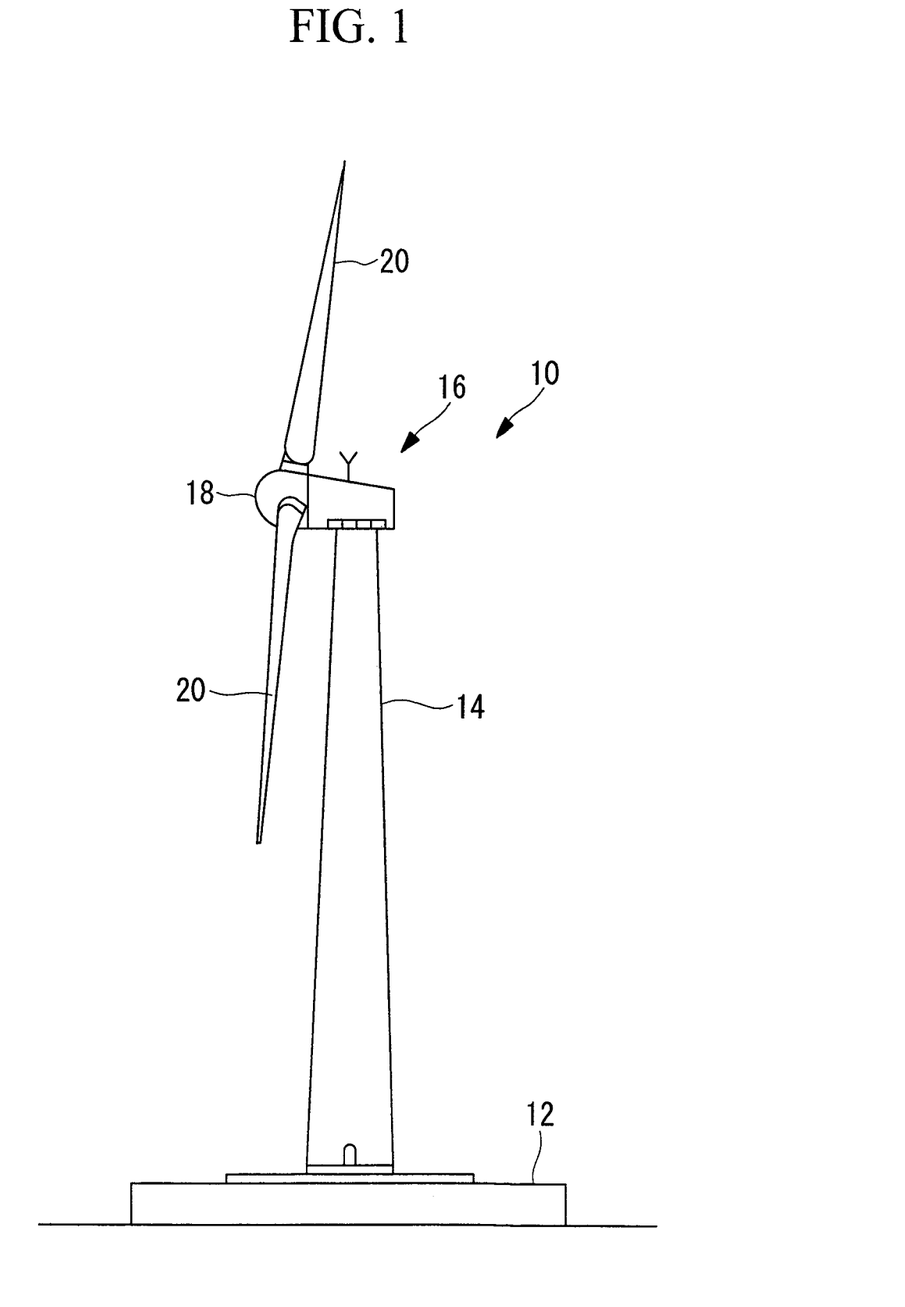
FIG. 1 is an external view of a wind turbine generator according to a first embodiment of the present invention.

FIG. 1 is an external view of a wind turbine generator 10 according to the first embodiment.

The wind turbine generator 10 shown in FIG. 1 is provided with a tower 14 disposed upright on a foundation 12, a nacelle 16 disposed on a top end of the tower 14, and a rotor 18 rotatably provided for the nacelle 16 about a substantially horizontal shaft.

The rotor 18 is provided with a plurality of (three, in the first embodiment) wind turbine rotation blades (hereinafter, simply referred to as "blades 20") arranged radially around the rotary shaft. With this, the power of wind blown against the blades 20 from a direction of the rotary shaft of the rotor 18 is converted into the power that rotates the rotor 18 about the rotary shaft, and this power is in turn converted into electrical power by the power generator (not shown in the drawing). Here, the blades 20 are turnably coupled to the rotor 18 with respect to the wind direction, thereby allowing to control a pitch angle of the blades 20.

In the wind turbine generator 10 as described above, for example, a hydraulic pressure is used for a blade pitch controller 40 (see FIG. 2) that controls a pitch angle of the individual blade 20. Further, there is provided a lubricating device configured to supply lubricant oil and lubricate a bearing that bears a main shaft that rotates along with the blades 20 and a rotating and sliding unit such as a gear box that increases a rotation speed of the blades 20 and the main shaft.

Figure 2:
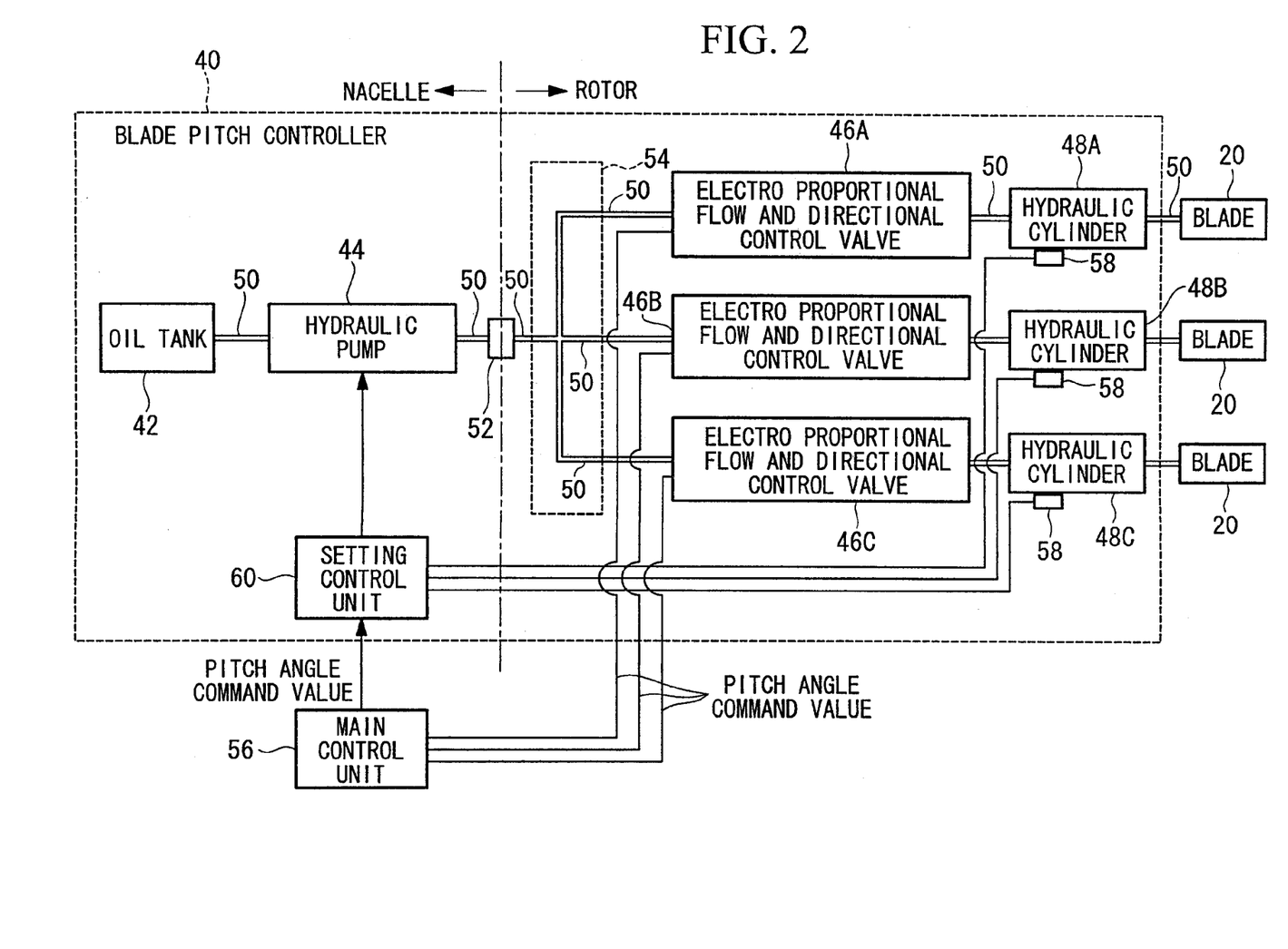
FIG. 2 is a block diagram illustrating a structure of a blade pitch controller for controlling a pitch angle of the blades according to the first embodiment of the present invention.

FIG. 2 is a block diagram illustrating a structure of the blade pitch controller 40 for controlling the pitch angle of the blades 20 according to the first embodiment.

The blade pitch controller 40 is provided with an oil tank 42, a hydraulic pump 44, electro proportional flow and directional control valves 46A, 46B, and 46C, and hydraulic cylinders 48A, 48B, and 48C, and each components are connected to each other via hydraulic piping 50. Here, each of the electro proportional flow and directional control valves 46A, 46B, and 46C, and each of the hydraulic cylinders 48A, 48B, and 48C are provided corresponding to each of the blades 20. In the description below, when the electro proportional flow and directional control valves are distinguished from one another, the reference numbers are postfixed by the respective letters A to C, and when the electro proportional flow and directional control valves are not distinguished from one another, the letters A to C are omitted. In addition, when the hydraulic cylinders are distinguished from one another, the reference numbers are postfixed by the respective letters A to C, and when the hydraulic cylinders are not distinguished from one another, the letters A to C are omitted.

The oil tank 42 stores hydraulic oil therein, and the hydraulic pump 44 suctions the hydraulic oil and increases its pressure, and supplies the hydraulic oil to the electro proportional flow and directional control valve 46 and the hydraulic cylinder 48 provided for each blade 20 through the hydraulic piping 50 via a rotary joint 52 and a distribution block 54.

To the electro proportional flow and directional control valve 46, a pitch angle command value indicating a setting value of the pitch angle of the blade 20 is transmitted from a main control unit 56 that controls the wind turbine generator 10 as a whole. Then, based on a spool position command value according to the received pitch angle command value, the electro proportional flow and directional control valve 46 switches hydraulic flow paths according to a direction to which the pitch angle of the blade 20 to be changed, and controls a flow rate of the hydraulic oil to be supplied to the hydraulic cylinders 48.

The hydraulic cylinder 48 is coupled to each blade 20, and configured to change the pitch angle of the blade 20 by driving. The hydraulic oil supplied to the hydraulic cylinder 48 presses a piston toward either left or right according to the hydraulic flow path and the flow rate set by the electro proportional flow and directional control valve 46. As a result, the blade 20 coupled to a piston rod of the hydraulic cylinders 48 is turned and controlled to a desired pitch angle according to a moving direction of the piston.

The rotary joint 52 joins a side of the nacelle 16 (stator unit) and a side of the rotor 18 (rotor unit) of the hydraulic piping 50, and the distribution block 54 distributes the hydraulic oil to each electro proportional flow and directional control valve 46.

Further, each of the hydraulic cylinders 48 according to the first embodiment is provided with a measurement unit 58 configured to measure a physical amount caused by the corresponding hydraulic cylinder 48. Here, the measurement unit 58 according to the first embodiment measures a thrust force of the hydraulic cylinders 48 as the physical amount.

In this case, the hydraulic pump 44 according to the first embodiment is a variable displacement hydraulic pump (for example, a swash plate hydraulic pump (so-called axial piston pump) in the first embodiment) in which, while a discharge flow rate follows a load flow rate, the discharge pressure does not follow the load pressure, and does not discharge the hydraulic oil at a pressure greater than a previously determined cut off pressure.

Figure 3:
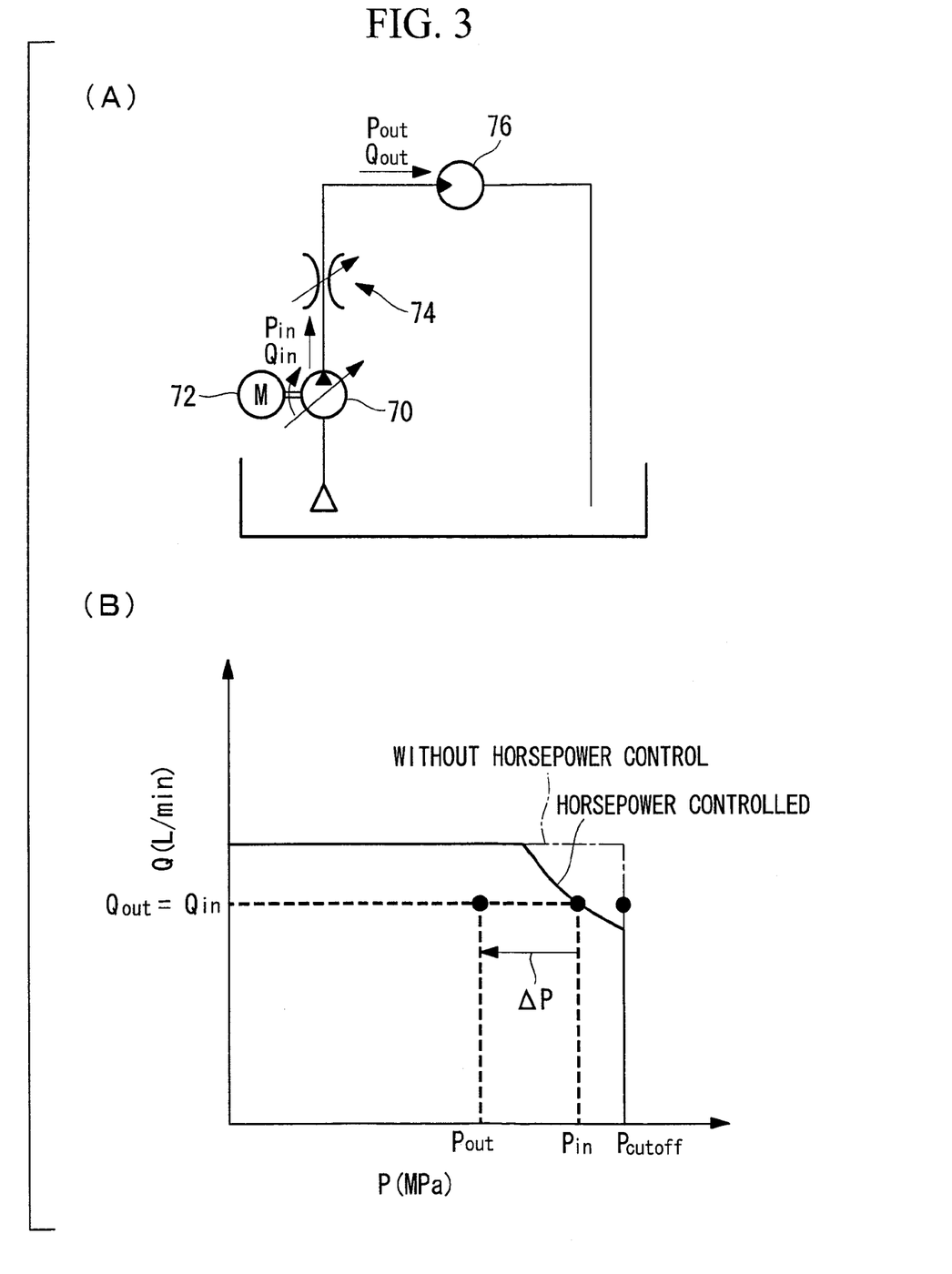
FIG. 3 is diagrams for explaining a dissipative energy of an axial piston pump, in which (A) shows one example of a hydraulic circuit using the axial piston pump, and (B) is a graphical chart showing one example of a relation between a discharge pressure and a discharge flow rate of the axial piston pump.

FIG. 3(A) shows one example of a hydraulic circuit using a conventional axial piston pump 70, FIG. 3(B) is a graphical chart showing one example of a relation between the discharge pressure and the discharge flow rate of the axial piston pump 70.

As shown in FIG. 3(A), the discharge flow rate from the axial piston pump 70 actuated by an electric motor 72 is taken as $Q_{in}$, and the discharge pressure from the axial piston pump 70 actuated by an electric motor 72 is taken as $P_{in}$. On the other hand, the load flow rate of a hydraulic motor (load) 76 connected via an orifice valve 74 is taken as $Q_{out}$, and the load pressure of the hydraulic motor 76 is taken as $P_{out}$. Further, a solid line shown in FIG. 3(B) is a hydraulic pressure-flow rate curve that indicates the relation between the discharge pressure and the discharge flow rate of the axial piston pump 70 that have been previously set, in a case in which a horsepower (product of the discharge pressure and the discharge flow rate) is controlled to be constant. In this case, as expressed by an equation (1), a product of a differential pressure ΔP between the discharge pressure $P_{in}$ [MPa] and the load pressure $P_{out}$ [MPa], and the discharge flow rate $Q_{in}$ [L/min] corresponds to a dissipative energy ΔL.

$$\Delta L = \frac{(P_{in} - P_{out})Q_{in}}{60} (\text{kw}) \quad (1)$$

On the other hand, an alternate long and short dash line shows a case in which the horsepower is not controlled, and in this case, a product of a differential pressure between a cut off pressure $P_{cutoff}$ [MPa] and the load pressure $P_{out}$ [MPa], and the discharge flow rate $Q_{in}$ [L/min] corresponds to the dissipative energy.

$$\Delta L = \frac{(P_{cutoff} - P_{out})Q_{in}}{60} (\text{kw}) \quad (2)$$

In this case, conventionally, the electro proportional flow and directional control valves consume the dissipative energy by an orifice, mainly as thermal energy, and the temperature of the hydraulic oil rises. Therefore, an output of the electric motor 72 for driving the axial piston pump 70 excessively increases by the differential pressure, and an oil cooler is also required in order to maintain the temperature of the hydraulic oil to be an adequate temperature.

Thus, the hydraulic pump 44 according to the first embodiment is provided with a pressure control valve 80 (see FIG. 4) that is opened when the discharge pressure of the hydraulic pump 44 becomes a set pressure, in order to make the discharge pressure of the hydraulic pump 44 to be a pressure smaller than a cut off pressure, by changing a discharge amount of the hydraulic pump 44 (changing a tilting amount of the swash plate of the hydraulic pump 44).

Figure 4:
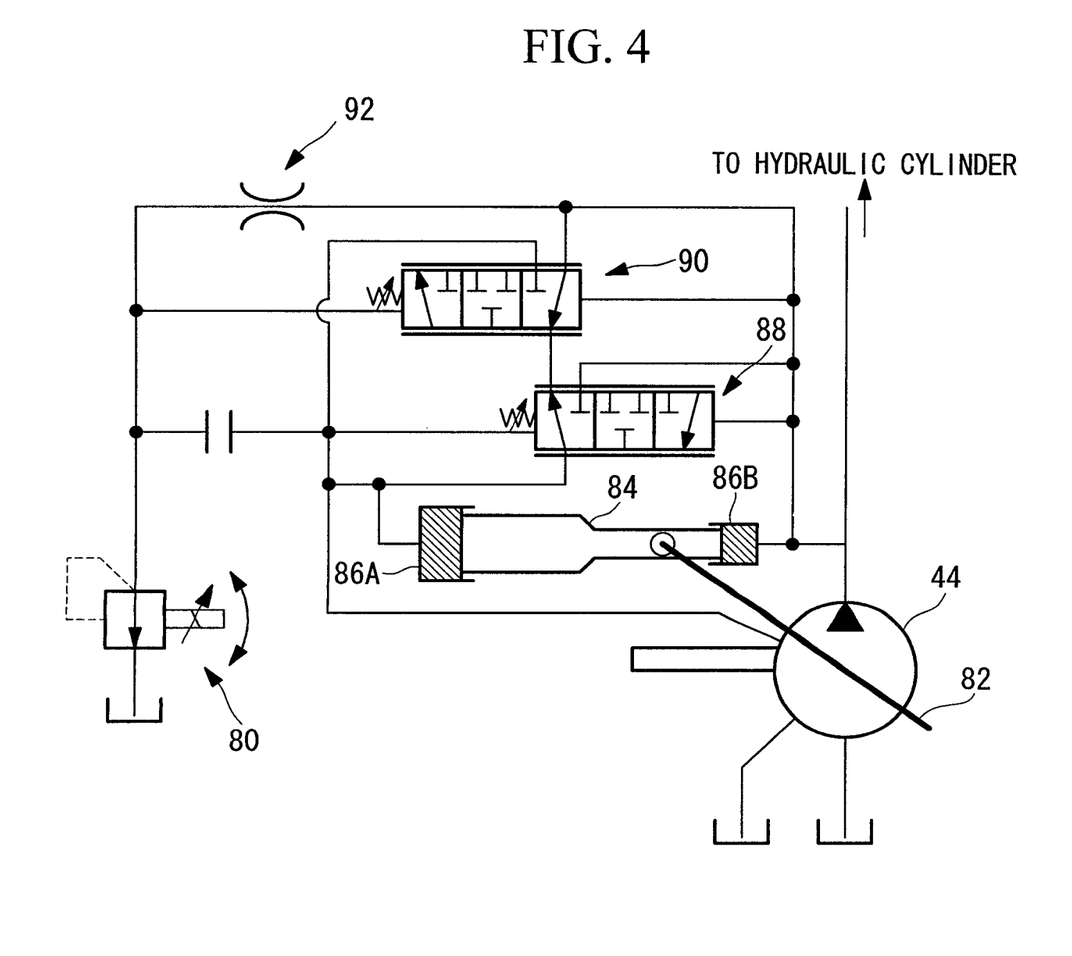
FIG. 4 is a hydraulic circuit diagram of a hydraulic pump according to the first embodiment of the present invention.

FIG. 4 is one example of a hydraulic circuit diagram of the hydraulic pump 44 according to the first embodiment (a hydraulic pump without the horsepower control). As shown in the figure, the hydraulic pump 44 having a swash plate 82 controls pressures within pressure chambers on both ends of a servo piston 84 (a large-diameter chamber 86A and a small-diameter chamber 86B) coupled to the swash plate 82 by a cut off spool 88 and a differential pressure spool 90, thereby changing the pump discharge flow rate. Here, a spring force and the discharge pressure of the hydraulic oil work on a left side of the differential pressure spool 90 in FIG. 4, and the discharge pressure of the hydraulic oil works on a right side of the differential pressure spool 90 in FIG. 4. Further, the pressure control valve 80 is connected to the differential pressure spool 90, on the left side of in FIG. 4, via the hydraulic piping or a manifold.

If the discharge pressure of the hydraulic pump 44 is smaller than the set pressure at which the pressure control valve 80 is open, an explanation is omitted as the operation is the same as the conventional known axial piston pump. However, if the discharge pressure of the hydraulic pump 44 reaches the set pressure, an operation described below is performed. Accordingly, the discharge pressure of the hydraulic pump 44 is controlled to be a pressure equal to or smaller than the cut off pressure that corresponds to the set pressure. Further, if the discharge pressure of the hydraulic pump 44 is smaller than the set pressure at which the pressure control valve 80 is open, the differential pressure spool 90 is positioned on the right side in FIG. 4 due to the spring force that acts on the differential pressure spool 90.

When the discharge pressure of the hydraulic pump 44 reaches the set pressure at which the pressure control valve 80 is open, the pressure control valve 80 opens and a pressure difference occurs on the right and the left of the differential pressure spool 90 by an orifice 92. The differential pressure spool moves onto the left side in FIG. 4 when this pressure difference becomes greater than the spring force that acts on the differential pressure spool 90.

With this, the discharge pressure is guided to the large-diameter chamber 86A of the servo piston 84, and the servo piston 84 decreases the tilting amount of the swash plate 82. Accordingly, the flow rate of the hydraulic pump 44 decreases.

On the other hand, when the flow rate that passes through the orifice 92 decreases, the pressure difference caused by the orifice 92 becomes smaller, and the differential pressure spool 90 returns to the right side again and the servo piston 84 increases the tilting amount of the swash plate 82.

By repeating such an operation, the discharge pressure of the hydraulic pump 44 according to the first embodiment is controlled to be the pressure equal to or smaller than the cut off pressure (a total pressure of the set pressures of the pressure control valve 80 and the differential pressure spool 90).

Here, a magnitude of the cut off pressure does not change as the cut off pressure as a maximum value of the discharge pressure of the hydraulic pump 44 is determined by the cut off spool 88.

Further, the blade pitch controller 40 according to the first embodiment is provided with a setting control unit 60 (see FIG. 2) configured to set the set pressure at which the pressure control valve 80 is open based on the hydraulic pressure that the hydraulic cylinders 48 requires, so that the discharge pressure of the hydraulic pump 44 becomes a pressure to change the pitch angle of the blades 20 to a predetermined angle by the hydraulic cylinders 48. Specifically, a process of setting the pressure at which the pressure control valve 80 is open (hereinafter referred to as the "pressure control valve setting process") is performed such that the differential pressure $\Delta P$ between the discharge pressure $P_{in}$ and the load pressure $P_{out}$ is reduced by the setting control unit 60. The predetermined angle is a pitch angle based on the pitch angle command value. Further, the hydraulic pressure that the hydraulic cylinders 48 requires is hereinafter referred to as the "required pressure" in the following description.

In this case, a thrust force value indicating a thrust force of the hydraulic cylinders 48 measured by the measurement unit 58 is consecutively transmitted to the setting control unit 60 according to the first embodiment. Then, the setting control unit 60 uses the thrust force value to derive the required pressure of the hydraulic cylinders 48, and sets the set pressure at which the pressure control valve 80 is open based on the derived required pressure.

Figure 5:
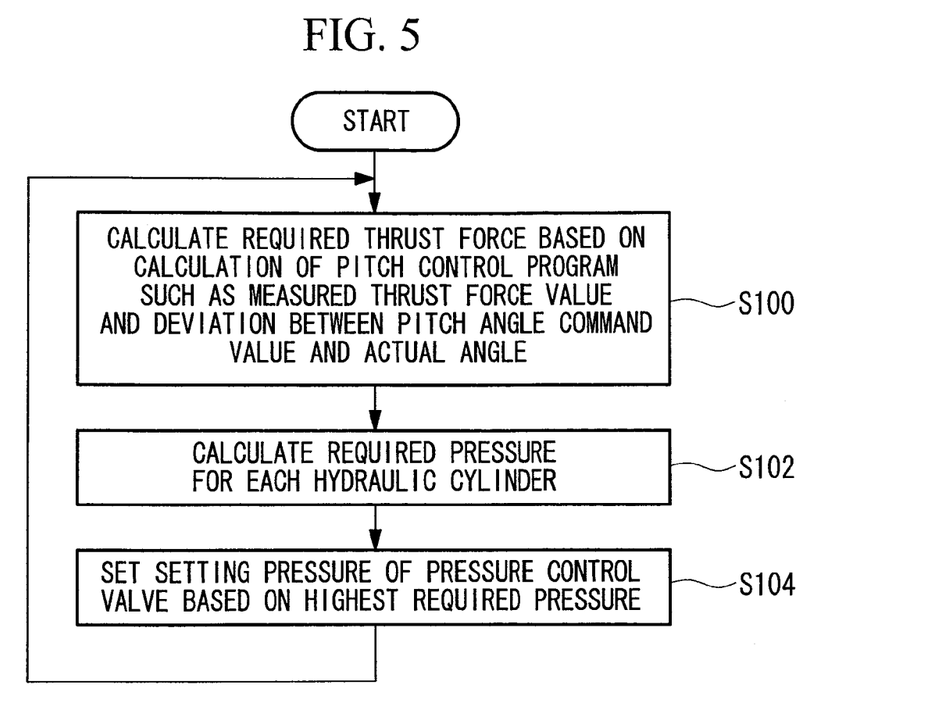
FIG. 5 is a flowchart showing a process flow of a discharge pressure control program according to the first embodiment of the present invention.

FIG. 5 is a flowchart showing a process flow of a pressure control valve setting program executed by the setting control unit 60 when performing the pressure control valve setting process, and the pressure control valve setting program is previously stored in a predetermined area of an undepicted storage device provided for the setting control unit 60 (a semiconductor storage device or a magnetic storage device). Here, the program starts as the operation of the wind turbine generator 10 starts.

First, in Step 100, a deviation of the pitch angle command value transmitted from the main control unit 56 from an actual pitch angle (actual angle) is calculated, and a thrust force that is required (hereinafter referred to as the "required thrust force") is calculated for each of the hydraulic cylinders 48 based on the measured thrust force value of the hydraulic cylinders 48 and the calculation within the pitch control program such as the deviation.

In Step 102 that follows, the required pressure is calculated for each of the hydraulic cylinders 48 from the required thrust force for each hydraulic cylinder 48 that has been calculated in Step 100. In the following description, the required pressure of the hydraulic cylinder 48A is taken as $P_A$, the required pressure of the hydraulic cylinder 48B is taken as $P_B$, and the required pressure of the hydraulic cylinder 48C is taken as $P_C$.

In Step 104 that follows, the set pressure of the pressure control valve 80 is set based on the required pressure that is the highest among the required pressures $P_A$, $P_B$, and $P_C$ that have been calculated in Step 102. Specifically, the set pressure of the pressure control valve 80 is set such that, for example, the pressure obtained by adding a pressure loss from the hydraulic pump 44 to the hydraulic cylinder 48 to the highest required pressure becomes the discharge pressure of the hydraulic pump 44. Then, this program is repeated until the operation of the wind turbine generator 10 is shutdown.

Figure 6:
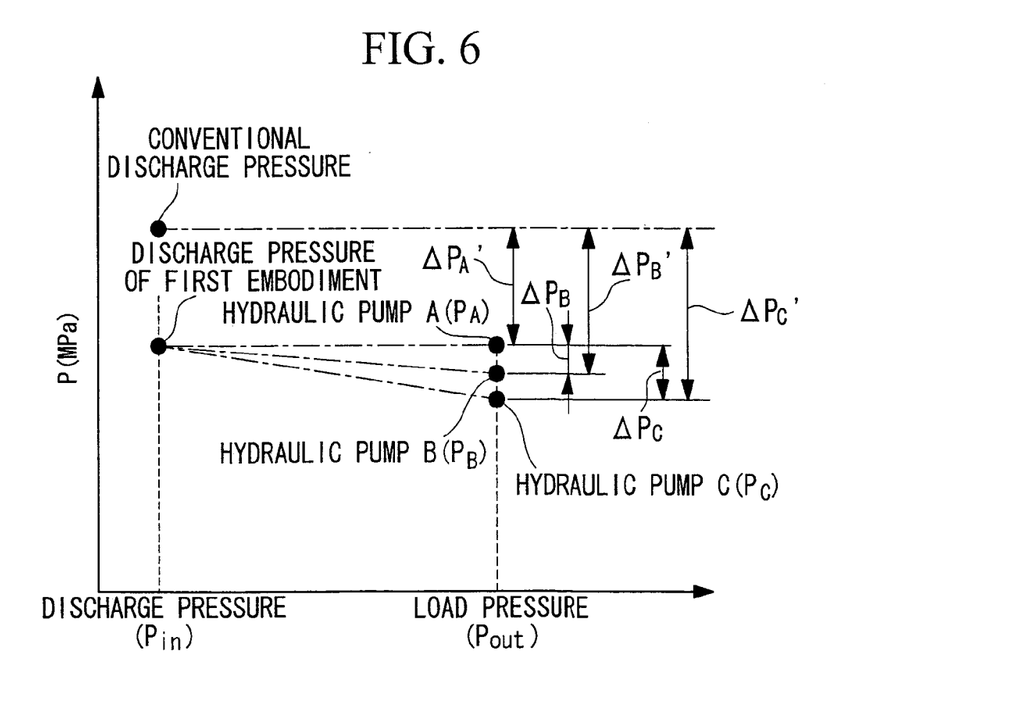
FIG. 6 is a diagram illustrating an effect of a pressure control valve setting process according to the first embodiment of the present invention.

FIG. 6 is a diagram illustrating an effect of the pressure control valve setting process.

In the case of the conventional hydraulic pump without the pressure control valve 80, differential pressures $\Delta P_A'$, $\Delta P_B'$, and $\Delta P_C'$ between the discharge pressure and respective required pressures $P_A$, $P_B$, and $P_C$ correspond to the dissipative energy.

On the other hand, according to the first embodiment, the set pressure at which the pressure control valve 80 is open is set such that the hydraulic pump 44 discharges the hydraulic oil at the discharge pressure equivalent to the required pressure $P_A$ that is a maximum value out of the required pressures $P_A$, $P_B$, and $P_C$. Therefore, in the blade pitch controller 40 according to the first embodiment, the discharge pressure is substantially equivalent to the required pressure $P_A$, and the discharge pressure of the hydraulic pump 44 is a minimum pressure required for driving the hydraulic cylinders 48. This makes the differential pressure between the discharge pressure and the required pressure $P_A$ vanishingly small. Further, as the differential pressure $\Delta P_B$ between the discharge pressure and the required pressure $P_B$ ($\Delta P_B < \Delta P_B'$) and the differential pressure $\Delta P_C$ between the discharge pressure and the required pressure $P_C$ ($\Delta P_C < \Delta P_C'$) correspond to the dissipative energy, the dissipative energy is reduced as compared to the conventional technique.

As described above, the blade pitch controller 40 according to the first embodiment is provided with the pressure control valve 80 that changes the tilting amount of the swash plate 82 provided for the hydraulic pump 44 by becoming open when the discharge pressure of the hydraulic pump 44 becomes the set pressure, thereby making the discharge pressure of the hydraulic pump 44 to be the pressure smaller than the cut off pressure. Further, the setting control unit 60 provided for the blade pitch controller 40 sets the set pressure based on the required pressure of the hydraulic cylinders 48, so that the discharge pressure of the hydraulic pump 44 becomes the pressure that changes the pitch angle to be the predetermined angle by the hydraulic cylinders 48.

Therefore, the discharge pressure of the hydraulic pump 44 is substantially equivalent to the pressure for driving the hydraulic cylinders 48, and the discharge pressure of the hydraulic pump 44 becomes the minimum pressure required for driving the hydraulic cylinders 48. Accordingly, it is possible to reduce the differential pressure between the discharge pressure of the hydraulic pump 44 and the load pressure even when the variable displacement hydraulic pump 44 is used for supplying the hydraulic oil to the hydraulic cylinders 48 in order to change the pitch angle of the blades 20. Further, the blade pitch controller 40 according to the first embodiment is able to make the minimum pressure required for driving the hydraulic cylinders 48, and therefore it is possible to reduce power consumption as compared to the conventional technique.

Moreover, even when the required pressures of the hydraulic cylinders 48 are different between the hydraulic cylinders 48, the setting control unit 60 sets the set pressure at which the pressure control valve 80 is open based on the highest required pressure. Therefore, according to the pitch control unit 40 of the first embodiment, it is possible to reduce the differential pressure between the discharge pressure of the hydraulic pump 44 and the load pressure even if the pitch angle of each blade 20 is controlled individually.

Further, the setting control unit 60 uses the thrust force of the hydraulic cylinders 48 measured by the measurement unit 58 to derive the required pressure of the hydraulic cylinders 48, and sets the set pressure at which the pressure control valve 80 is open based on the derived hydraulic pressure. Therefore, according to the pitch control unit 40 of the first embodiment, it is possible to constantly derive the required pressure of the hydraulic cylinders 48 more easily.

While the first embodiment describes the case in which measurement unit 58 measures the thrust force of the hydraulic cylinders 48, and calculates the required pressure for each of the hydraulic cylinders 48 using the measured thrust force. However, the present invention is not limited to such a case, and can be such that, for example, the measurement unit 58 measures a pressure of the hydraulic cylinders 48, and calculates the required pressure for each of the hydraulic cylinders 48 using the measured pressure.

Second Embodiment

The following describes a second embodiment according to the present invention.

Figure 7:
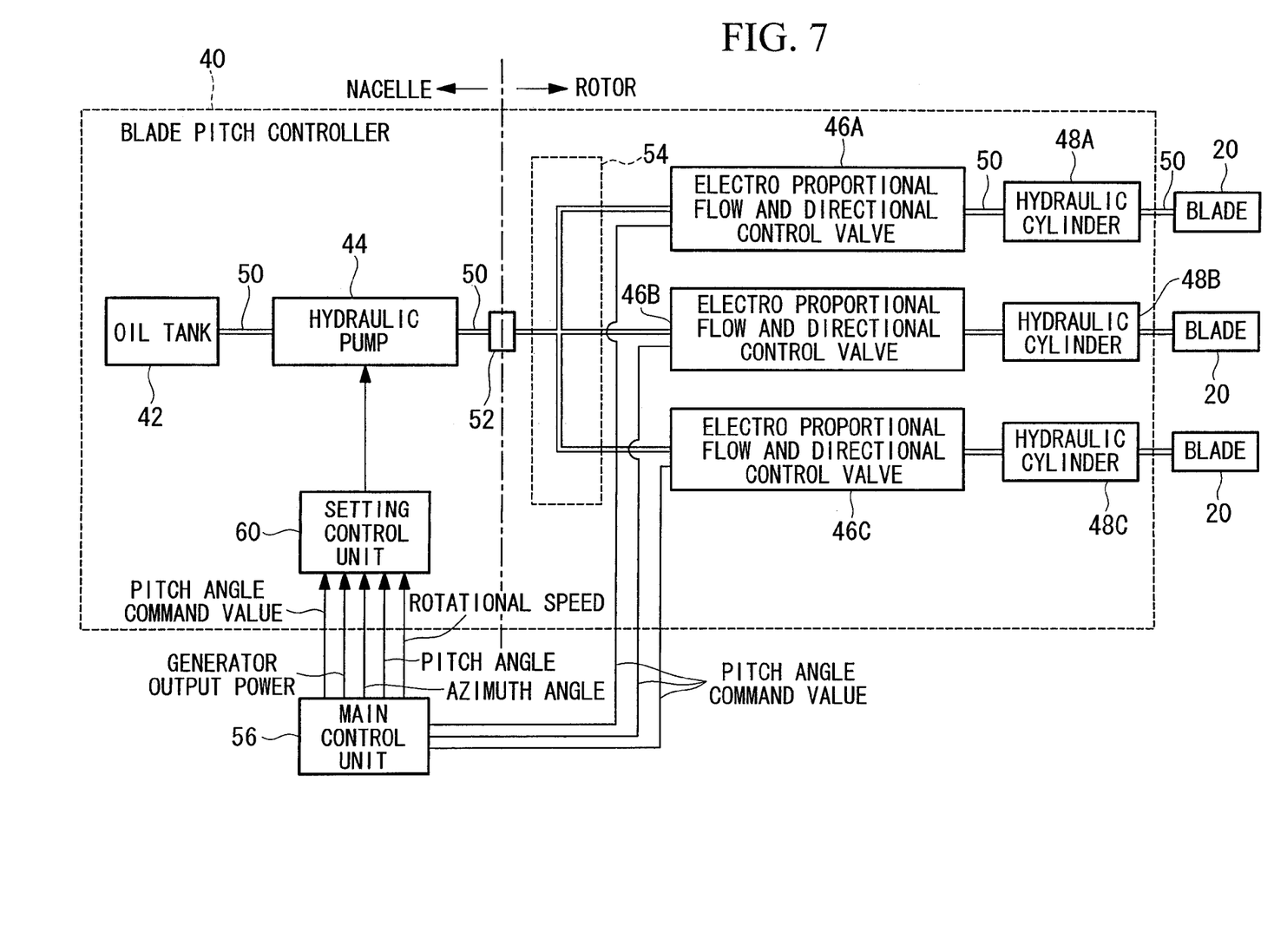
FIG. 7 is a block diagram illustrating a structure of a blade pitch controller for controlling a pitch angle of blades according to a second embodiment of the present invention.

FIG. 7 illustrates a structure of a blade pitch controller 40 according to the second embodiment. Here, like components in FIG. 7 as those shown in FIG. 2 are denoted by like reference numbers as in FIG. 2, and explanations for those components are omitted. Further, a structure of a hydraulic pump 44 according to the second embodiment is the same as that of the hydraulic pump 44 according to the first embodiment illustrated in FIG. 4.

A hydraulic cylinders 48 according to the second embodiment is not provided with a measurement unit 58, unlike the first embodiment.

Further, a setting control unit 60 (pressure control valve setting process) according to the second embodiment uses information that a wind turbine generator 10 holds, such as an output from a power generator provided for the wind turbine generator 10 (hereinafter referred to as the "power generator output power"), a pitch angle of blades 20, an azimuth angle of the blades 20, and a rotation speed of a rotor 18, to estimate and derive a required pressure of the hydraulic cylinders 48, and sets a set pressure at which a pressure control valve 80 is open based on the derived required pressure.

Figure 8:
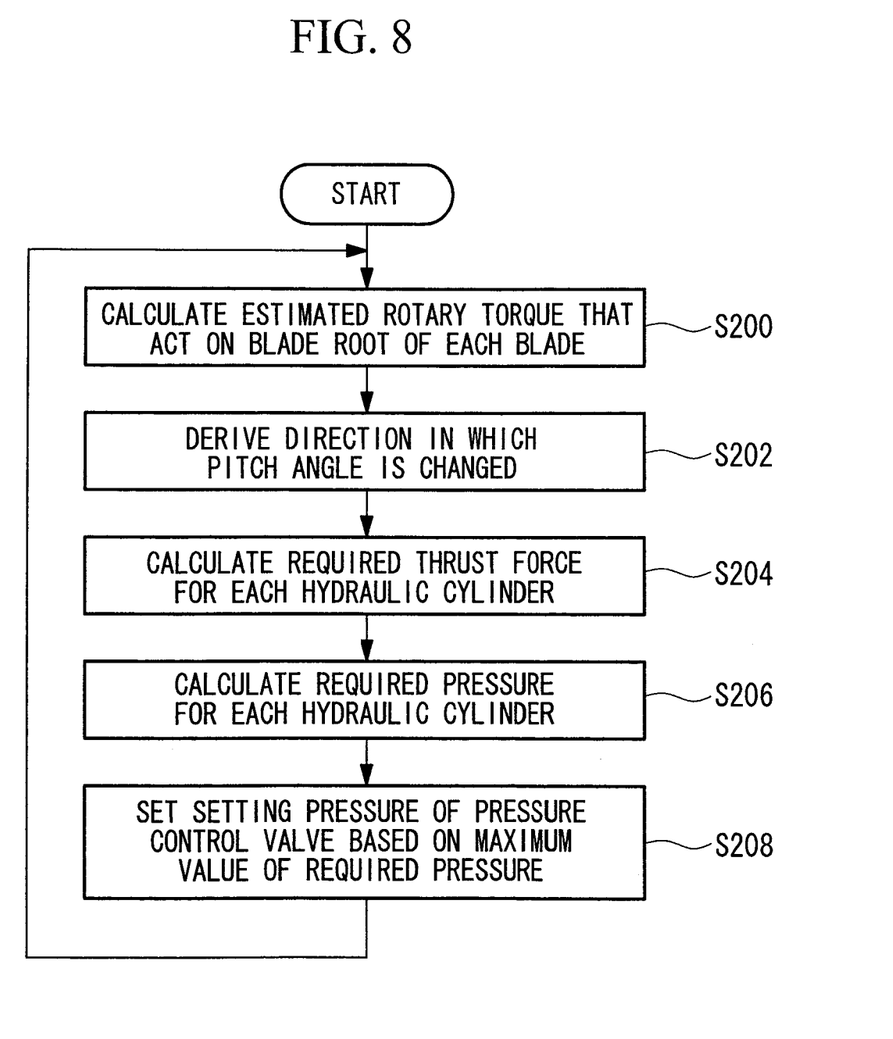
FIG. 8 is a flowchart showing a process flow of a discharge pressure control program according to the second embodiment of the present invention.

FIG. 8 is a flowchart showing a process flow of a pressure control valve setting program executed by the setting control unit 60 when performing the pressure control valve setting process, and the pressure control valve setting program is previously stored in a predetermined area of an undepicted storage device provided for the setting control unit 60 (a semiconductor storage device or a magnetic storage device). Here, the program starts as the operation of the wind turbine generator 10 starts.

First, in Step 200, estimated rotary torque that acts on a blade root of each blade 20 is calculated using the power generator output power, the pitch angle, the azimuth angle, and the rotation speed.

In Step 202 that follows, it is determined from a temporal change of a pitch angle command value whether the pitch angle command value is for tilting the blades 20 in a fine direction or in a feathered direction.

In Step 204 that follows, a required thrust force is calculated for each of the hydraulic cylinders 48 based on the rotate torque calculated in Step 200, the direction in which the blades 20 derived in Step 202 are tilted, and a deviation between the pitch angle command value and an actual angle.

In Step 206 that follows, required pressures $P_A$, $P_B$, and $P_C$ are calculated for each of the hydraulic cylinders 48 from the required thrust force for each hydraulic cylinder 48 that has been calculated in Step 204.

In Step 208 that follows, the set pressure of the pressure control valve 80 is set based on the required pressure that is the highest among the required pressures $P_A$, $P_B$, and $P_C$ that have been calculated in Step 206, and the program is repeated until the operation of the wind turbine generator 10 is shut-down.

As described above, the blade pitch controller 40 according to the second embodiment uses the information held by the wind turbine generator 10 to derive the required pressure of the hydraulic cylinders 48, and sets the set pressure at which the pressure control valve 80 is open based on the derived required pressure. Therefore, according to the blade pitch controller 40 of the second embodiment, it is possible to constantly derive the required pressure of the hydraulic cylinders 48 with a simple configuration.

In the above, while the present invention has been described according to the embodiments, the technical scope of the present invention is not limited to the scope of the embodiments described above. Various modifications and improvements can be made to the embodiments described above without departing the spirit of the invention, and embodiments including such modifications and improvements are also included within the technical scope of the present invention.

For example, the above embodiment describe the cases in which the plurality of blades 20 are respectively provided with the plurality of electro proportional flow and directional control valves 46 and the plurality of hydraulic cylinders 48 for controlling the respective pitch angles, and the pitch angle is independently controlled for each of the blades 20. However, the present invention is not limited to this case, and a single electro proportional flow and directional control valve 46 and a single hydraulic cylinder 48 are provided, the pitch angle of the plurality of blades 20 is controlled separately.

Further, according to the embodiment, the case in which the swash plate hydraulic pump (axial piston pump) is used as the variable displacement hydraulic pump 44 is described. However, the present invention is not limited to this case, and it is possible to use a radial piston pump as the variable displacement hydraulic pump.

What is claimed is:

1. A blade pitch controller for a wind turbine generator that generates power by rotation of a rotor to which a plurality of blades are turnably coupled, the blade pitch controller comprising:
   a hydraulic cylinder coupled to the blades and configured to be actuated to change a pitch angle of the blades;
   a variable displacement hydraulic pump configured to supply hydraulic oil to the hydraulic cylinder, a discharge pressure of the pump not following a load pressure, the hydraulic oil not being discharged at a pressure greater than a previously determined first pressure;
   a valve configured to be opened to change a discharge amount of the hydraulic pump and to make the discharge pressure of the hydraulic pump to be a second pressure when the discharge pressure of the hydraulic pump becomes a set pressure, the second pressure corresponding to the set pressure;
   a pitch angle setting unit configured to set a set value of a pitch angle of the blade;
   a calculating unit configured to calculate a deviation angle of a first pitch angle from a second pitch angle, the first pitch angle corresponding to the set value set by the pitch angle setting unit, the second pitch angle corresponding to an actual pitch angle of the blade; and
   a discharge pressure setting unit configured to set, when the variable displacement hydraulic pump supplies the hydraulic oil at the second pressure, the set pressure on a basis of the deviation angle calculated by the calculating unit such that the hydraulic cylinder generates a hydraulic pressure required for changing the actual pitch angle to the first pitch angle.

2. The blade pitch controller according to claim 1, wherein the hydraulic cylinder is one of a plurality of hydraulic cylinders, and
   the discharge pressure setting unit sets the set pressure based on a highest hydraulic pressure out of hydraulic pressures that the plurality of hydraulic cylinders respectively require.

3. The blade pitch controller according to claim 1, further comprising:
   a measuring unit configured to measure a physical amount generated by the hydraulic cylinder,
   wherein the discharge pressure setting unit derives the hydraulic pressure that the hydraulic cylinder requires using the physical amount measured by the measuring unit, and sets the set pressure based on the derived hydraulic pressure.

4. The blade pitch controller according to claim 1, wherein the discharge pressure setting unit derives the hydraulic pressure that the hydraulic cylinder requires using information that the wind turbine generator holds, and sets the set pressure based on the derived hydraulic pressure.

5. The blade pitch controller according to claim 4, wherein the information that the wind turbine generator holds includes at least one of an output of a power generator provided for the wind turbine generator, the pitch angle of the blades, an azimuth angle of the blades, and a rotation speed of the rotor.

6. A wind turbine generator comprising:
   a rotor provided with a plurality of blades; and
   a blade pitch controller according to claim 1, the apparatus changing a pitch angle of the plurality of blades provided for the rotor.

7. A method of controlling a blade pitch for a wind turbine generator provided with: a hydraulic cylinder coupled to blades and configured to be actuated to change a pitch angle of the blades; a variable displacement hydraulic pump configured to supply hydraulic oil to the hydraulic cylinder, a discharge pressure of the pump not following a load pressure, the hydraulic oil not being discharged at a pressure greater than a previously determined first pressure, and a valve configured to be opened to change a discharge amount of the hydraulic pump and to make the discharge pressure of the hydraulic pump to be a second pressure when the discharge pressure of the hydraulic pump becomes a set pressure, the second pressure corresponding to the set pressure, the method comprising the steps of:
   setting a set value of a pitch angle of the blade;
   calculating a deviation angle of a first pitch angle from a second pitch angle, the first pitch angle corresponding to the set value set by the pitch angle setting unit, the second pitch angle corresponding to an actual pitch angle of the blade; and
   setting, when the variable displacement hydraulic pump supplies the hydraulic oil at the second pressure, the set pressure on a basis of the calculated deviation angle such that the hydraulic cylinder generates a hydraulic pressure required for changing the actual pitch angle to the first pitch angle.

8. The blade pitch controller according to claim 1, further comprising:
   an orifice communicated directly with an output of the pump and interposed directly between the pump and the valve configured to be opened to change the discharge amount of the hydraulic pump.

9. The blade pitch controller according to claim 8, further comprising:
   a differential pressure spool responsive to pressures upstream and downstream of the orifice.

* * * * *